(12) United States Patent
Robel

(10) Patent No.: US 7,799,289 B2
(45) Date of Patent: Sep. 21, 2010

(54) EXHAUST TREATMENT SYSTEM WITH NO₂ CONTROL

(75) Inventor: Wade J. Robel, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 646 days.

(21) Appl. No.: 11/882,330

(22) Filed: Jul. 31, 2007

(65) Prior Publication Data
US 2009/0035195 A1    Feb. 5, 2009

(51) Int. Cl.
*B01D 50/00*    (2006.01)
*B01D 47/00*    (2006.01)

(52) U.S. Cl. .................................. 422/180; 423/210
(58) Field of Classification Search ................ 422/168, 422/177, 180; 423/210
See application file for complete search history.

(56) References Cited

U.S. PATENT DOCUMENTS

| | | | |
|---|---|---|---|
| 3,791,143 A | 2/1974 | Keith et al. |
| 4,912,776 A | 3/1990 | Alcorn |
| 5,448,887 A | 9/1995 | Takeshima |
| 6,125,629 A | 10/2000 | Patchett |
| 6,212,885 B1 | 4/2001 | Hirota et al. |
| 6,805,849 B1 | 10/2004 | Andreasson et al. |
| 6,807,807 B2 | 10/2004 | Kagenishi |
| 6,823,660 B2 | 11/2004 | Minami |
| 6,823,663 B2 | 11/2004 | Hammerle et al. |
| 6,843,971 B2 | 1/2005 | Schäfer-Sindlinger et al. |
| 6,846,464 B2 | 1/2005 | Montreuil et al. |
| 6,871,489 B2 | 3/2005 | Tumati et al. |
| 6,928,806 B2 | 8/2005 | Tennison et al. |
| 6,947,831 B2 | 9/2005 | van Nieuwstadt |
| 6,973,776 B2 | 12/2005 | van Nieuwstadt et al. |
| 7,005,116 B2 | 2/2006 | Schäfer-Sindlinger et al. |
| 7,062,904 B1 | 6/2006 | Hu et al. |
| 7,143,578 B2 | 12/2006 | Kakwani et al. |
| 7,178,328 B2 | 2/2007 | Solbrig |

(Continued)

FOREIGN PATENT DOCUMENTS

DE    102006043081    6/2007

(Continued)

OTHER PUBLICATIONS

International Patent Application No. PCT/IB2007/003065, filed May 2, 2007, entitled Exhaust Treatment System Implementing Selective DOC Bypass.

(Continued)

*Primary Examiner*—Tom Duong
(74) *Attorney, Agent, or Firm*—Finnegan, Henderson, Farabow, Garrett & Dunner LLC

(57) ABSTRACT

An exhaust treatment system includes a catalyzed particulate filter disposed in a first passageway and configured to receive a first portion of a flow of exhaust. The catalyzed particulate filter is at least partially coated with a catalytic material for converting NO to $NO_2$. The exhaust treatment system also includes a second passageway configured to direct a second portion of the flow of exhaust around the catalyzed particulate filter and a selective catalytic reduction device disposed downstream from the first passageway and the second passageway. The selective catalytic reduction device is configured to receive a combined flow of exhaust including the first and second portions of the flow of exhaust.

28 Claims, 9 Drawing Sheets

U.S. PATENT DOCUMENTS

| | | |
|---|---|---|
| 2004/0258594 A1 | 12/2004 | Andreasson et al. |
| 2005/0031514 A1 | 2/2005 | Patchett et al. |
| 2005/0069476 A1 | 3/2005 | Blakeman et al. |
| 2006/0117742 A1 | 6/2006 | Bellinger et al. |
| 2006/0213187 A1 | 9/2006 | Kupe et al. |
| 2007/0108039 A1* | 5/2007 | Neubauer et al. ........... 204/164 |
| 2007/0144150 A1* | 6/2007 | Breuer et al. ................. 60/286 |
| 2008/0041053 A1* | 2/2008 | Doring et al. ................. 60/612 |

FOREIGN PATENT DOCUMENTS

| | | |
|---|---|---|
| DE | 102006043083 | 6/2007 |
| EP | 1662122 A2 | 5/2006 |
| EP | 1892394 | 2/2008 |
| EP | 1892395 | 2/2008 |
| JP | 2005002968 A | 1/2005 |
| WO | WO-03/054364 A2 | 7/2003 |
| WO | WO-2007/010985 A1 | 1/2007 |
| WO | 2007046518 | 4/2007 |

OTHER PUBLICATIONS

International Patent Application No. PCT/US07/10638, filed May 2, 2007, entitled Exhaust Treatment System Implementing Selective Doc Bypass.

U.S. Appl. No. 11/806,433, filed May 31, 2007, entiled Exhaust System Utilizing a Low-Temperature Oxidation Catalyst.

* cited by examiner

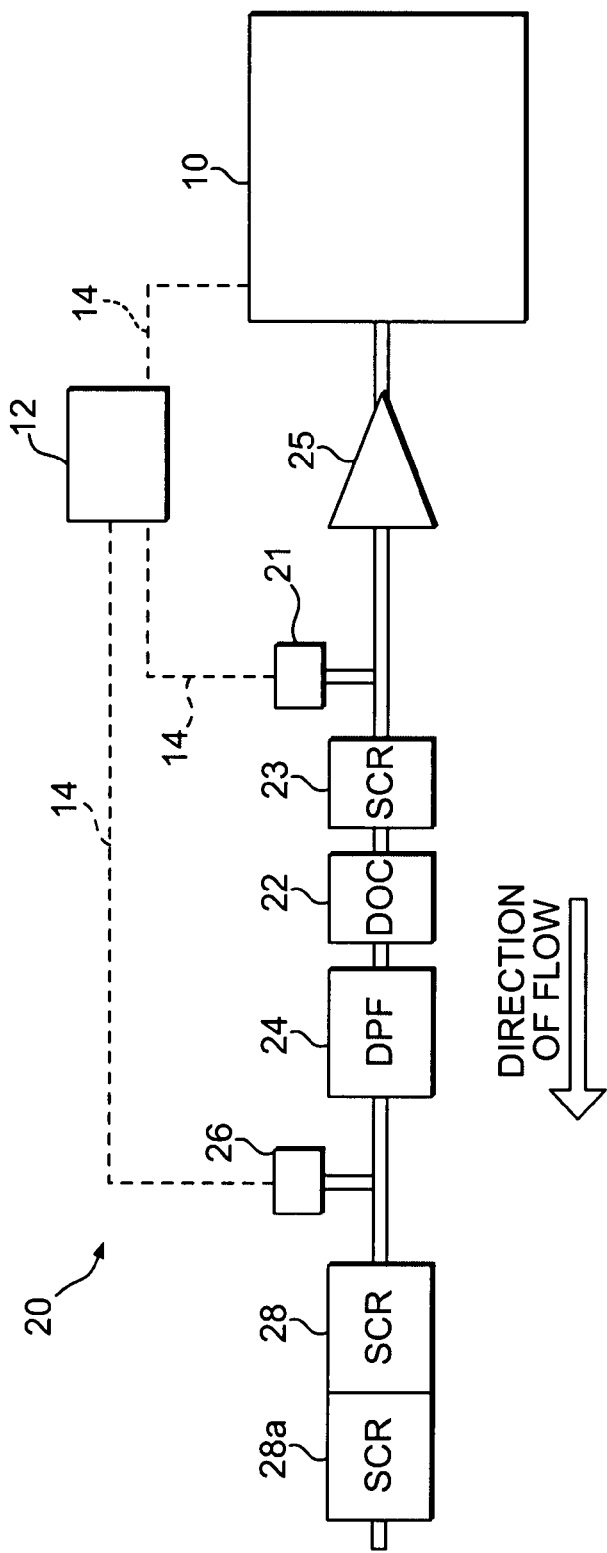
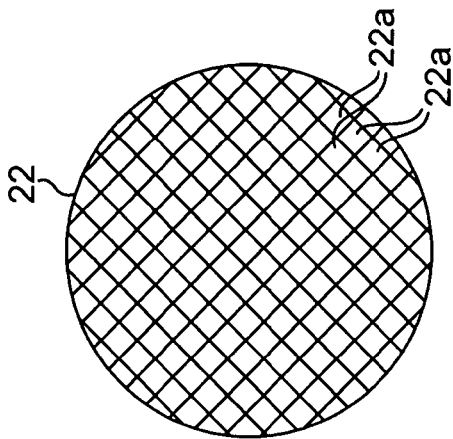

EXHAUST TREATMENT SYSTEM WITH NO₂ CONTROL

TECHNICAL FIELD

The present disclosure relates generally to an exhaust treatment system, and more particularly, to an exhaust treatment system with $NO_2$ control.

BACKGROUND

Internal combustion engines, including diesel engines, gasoline engines, gaseous fuel-powered engines, and other engines known in the art, may exhaust a complex mixture of air pollutants. The air pollutants may be composed of gaseous and solid compounds, including particulate matter, nitrogen oxides (NOx), and sulfur compounds. Due to heightened environmental concerns, exhaust emission standards have become increasingly stringent. The amount of pollutants emitted from an engine may be regulated depending on the type, size, and/or class of engine. One method that has been implemented by engine manufacturers to comply with the regulation of NOx exhausted to the environment has been to implement a strategy called selective catalytic reduction (SCR).

SCR is a process by which gaseous or liquid reductant (e.g., urea or ammonia) is added to the flow of exhaust from an engine. The combined flow is then absorbed onto a catalyst. The reductant reacts with NOx in the flow of exhaust to form $H_2O$ and $N_2$. SCR may be more effective when a ratio of NO to $NO_2$ in the flow of exhaust supplied to the SCR catalyst is about 50:50. Some engines, however, may produce a flow of exhaust having a NO to $NO_2$ ratio of approximately 95:5. In order to increase the relative amount of $NO_2$ to achieve a NO to $NO_2$ ratio of closer 50:50, a diesel oxidation catalyst (DOC) may be located upstream of the SCR catalyst to convert NO to $NO_2$.

One system that includes a DOC to increase a relative amount of $NO_2$ in a flow of exhaust is described in U.S. Pat. No. 6,846,464 (the '464 patent) issued to Montreuil et al. The '464 patent describes a catalytic device including two chambers. The first chamber includes tubes coated with a catalytic material such as platinum that oxidizes NO and hydrocarbons. The second chamber includes tubes coated with a catalytic material such as palladium that oxidizes NO and hydrocarbons. An SCR catalyst is provided downstream from the two chambers of the catalytic device.

Although the system of the '464 patent may provide an oxidation catalyst that increases the amount of $NO_2$ in the flow of exhaust, all of the tubes of the oxidation catalyst are coated with an NO oxidizing material, such as platinum or palladium. Therefore, the entire flow of exhaust contacts either the platinum or the palladium coating on the oxidation catalyst. As a result, there is a risk of providing too much $NO_2$ compared to NO. When there is too much $NO_2$, NOx reduction in the reduction catalyst is much slower, and therefore, a larger reduction catalyst is necessary to effectively reduce NOx in the flow of exhaust.

The disclosed system is directed to overcoming one or more of the problems set forth above.

SUMMARY OF THE INVENTION

In one aspect, the present disclosure is directed to an exhaust treatment system. The exhaust treatment system includes a catalyzed particulate filter disposed in a first passageway and configured to receive a first portion of a flow of exhaust. The catalyzed particulate filter is at least partially coated with a catalytic material for converting NO to $NO_2$. The exhaust treatment system also includes a second passageway configured to direct a second portion of the flow of exhaust around the catalyzed particulate filter and a selective catalytic reduction device disposed downstream from the first passageway and the second passageway. The selective catalytic reduction device is configured to receive a combined flow of exhaust including the first and second portions of the flow of exhaust.

In another aspect, the present disclosure is directed to a method for treating a flow of exhaust. The method includes generating the flow of exhaust and passing a first portion of the flow of exhaust through a first passageway including a catalyzed particulate filter that is at least partially coated with a catalytic material for converting NO to $NO_2$. The method also includes passing a second portion of the flow of exhaust through a second passageway configured to direct the second portion of the flow of exhaust around the catalyzed particulate filter. In addition, the method includes combining the first and second portions of the flow of exhaust downstream from the catalyzed particulate filter to form a combined flow of exhaust, and directing the combined flow of exhaust to a selective catalytic reduction device.

In yet another aspect, the present disclosure is directed to an exhaust treatment system including a catalyzed particulate filter disposed in a first passageway and configured to receive a first portion of a flow of exhaust. The catalyzed particulate filter is at least partially coated with a catalytic material for converting NO to $NO_2$. The exhaust treatment system further includes an upstream injector disposed upstream from the catalyzed particulate filter. The upstream injector is configured to inject reductant into the first portion of the flow of exhaust. The exhaust treatment system also includes a second passageway configured to direct a second portion of the flow of exhaust around the catalyzed particulate filter, and a selective catalytic reduction device disposed downstream from the catalyzed particulate filter and the second passageway. The selective catalytic reduction device is configured to receive a combined flow of exhaust including the first and second portions of the flow of exhaust.

BRIEF DESCRIPTION OF THE DRAWINGS

FIG. 1 is a diagrammatic illustration of an exemplary disclosed engine and exhaust treatment system;

FIG. 2 is a cross-sectional view of an exemplary disclosed oxidation device for the exhaust treatment system of FIG. 1;

DETAILED DESCRIPTION

Figure 3:
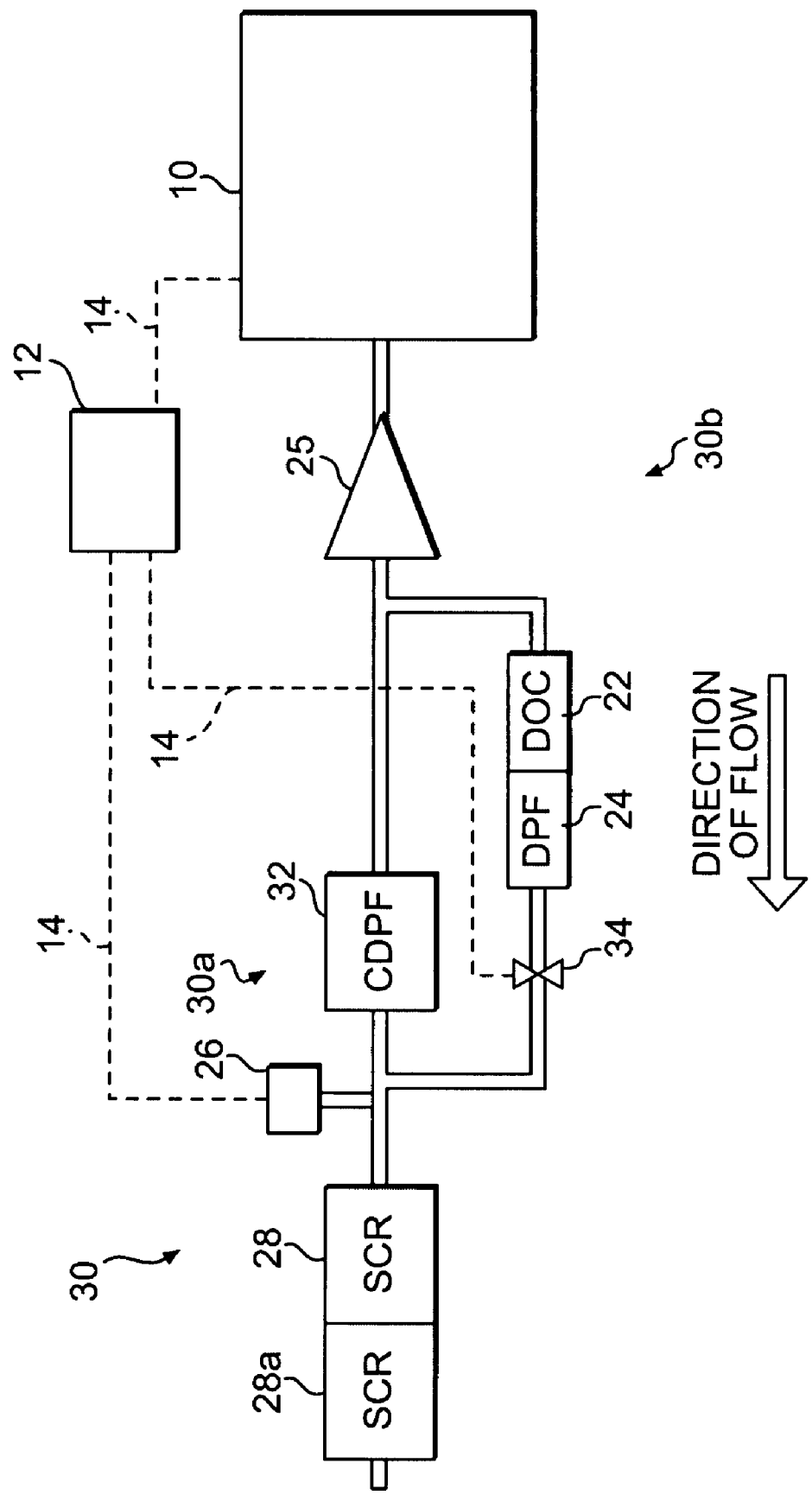
FIG. 3 is a diagrammatic illustration of an exemplary disclosed engine and exhaust treatment system having two legs.

Reference will now be made in detail to exemplary embodiments, which are illustrated in the accompanying drawings. Wherever possible, the same reference numbers will be used throughout the drawings to refer to the same or like parts.

As shown in FIG. 1, a power source, such as an engine 10, of a machine is provided. The disclosed embodiment may be applicable to various types of machines such as, for example, a fixed or mobile machine that performs some type of operation associated with an industry such as mining, construction, farming, transportation, power generation, tree harvesting, forestry, or any other industry known in the art. The engine 10 may be an internal combustion engine, such as, for example, a diesel engine, a gasoline engine, a gaseous fuel-powered engine, or any other engine apparent to one skilled in the art. The engine 10 may alternatively be another source of power such as a furnace or any other suitable source of power for a powered system such as a factory or power plant. Operation of the engine 10 may produce power and a flow of exhaust. For example, each combustion chamber (not shown) of the engine 10 may mix fuel with air and combust the mixture therein to produce a flow of exhaust directed into an exhaust passageway. The flow of exhaust may contain carbon monoxide, NOx, carbon dioxide, aldehydes, soot, oxygen, nitrogen, water vapor, and/or hydrocarbons such as hydrogen and methane.

An exhaust treatment system 20 is provided with the engine 10. The flow of exhaust may be fluidly communicated from the engine 10 to the exhaust treatment system 20. Although not shown, other components such as, for example, one or more turbochargers, or any other component for treating or handling exhaust known in the art may be disposed between the exhaust passageway of the engine 10 and the inlet of the exhaust treatment system 20. In addition, other emission control devices, e.g., exhaust gas recirculation devices, may be disposed within or fluidly connected to the exhaust passageway of the engine 10.

The exhaust treatment system 20 shown in FIG. 1 may optionally include an upstream injector 21 disposed upstream from an upstream SCR device 23. The upstream injector 21 may be provided to inject reductant, such as urea, ammonia, and/or other elements or compounds capable of chemically reducing, e.g., NOx, contained within the flow of exhaust at predetermined timings, pressures, and flow rates.

An upstream SCR device 23, such as an SCR catalyst, may be disposed downstream of the upstream injector 21. The upstream SCR device 23 may chemically reduce the amount of NOx in the flow of exhaust. Reductant injected into the flow of exhaust upstream from the upstream SCR device 23 may be absorbed onto the upstream SCR device 23 so that the reductant may react with NOx in the flow of exhaust to form $H_2O$ (water vapor) and $N_2$ (nitrogen gas).

The exhaust treatment system 20 shown in FIG. 1 includes an oxidation device 22, such as a DOC, that receives the flow of exhaust directly from the engine 10 or from the upstream SCR device 23, if provided. If the upstream SCR device 23 is provided, it may be close-coupled to the oxidation device 22. The oxidation device 22 may be a device with a porous ceramic honeycomb-like or metal mesh structure. FIG. 2 shows a cross-sectional view of an exemplary honeycomb-like structure of the oxidation device 22. The oxidation device 22 includes holes 22a, channels, passageways, or other openings through which the flow of exhaust may pass. According to an embodiment, the oxidation device 22 may be "partially-loaded," i.e., a percentage less than 100% (e.g., approximately 50%) of the holes may be coated with platinum or another material for oxidizing NO, such as palladium, metal oxide, rhodium, or other precious metal. Alternatively, the percentage of holes 22a coated with the NO oxidizing material may be, e.g., approximately 25%, 35%, 45%, 55%, 65%, 75%, etc., or any percentage therebetween. The remaining holes may be uncoated. The percentage of holes 22a coated may be determined experimentally as described below based on the application to obtain a target amount of $NO_2$ in the resulting flow of exhaust, e.g., 50% NO and 50% $NO_2$. Accordingly, only a percentage of the total flow of exhaust flowing through the oxidizing device 22 contacts the NO oxidizing material, and the percentage of the total flow of exhaust contacting NO oxidizing material depends on the percentage of holes 22a coated.

As shown in FIG. 1, the exhaust treatment system 20 may include a particulate filter 24, which may be disposed downstream of the oxidation device 22. The particulate filter 24 may be a non-catalyzed filter and may include a wire mesh or ceramic honeycomb filtration media utilized to remove particulate matter from the flow of exhaust. Alternatively, the particulate filter 24 may be another type of device that physically captures particulates, ash, or other materials from the flow of exhaust. The particulate filter 24 may be a wall flow type filter, flow through type filter, or other type of filter known in the art. A "wall flow type" filter may refer to, e.g., a filter that includes a plurality of passages and opposite ends of adjacent passages may be blocked or plugged in order to force the flow of exhaust to travel radially through a plurality of relatively thin porous walls. A "flow through type" filter may refer to, e.g., a filter that can capture and store particulate matter while allowing open passages through which the flow of exhaust may flow. For example, a flow through type filter may include sheets or other blocking mechanisms that may divert particulate matter toward a mesh lining sides of the open passages. Alternatively, the particulate filter 24 may be omitted if the flow of exhaust from the engine 10 has lower amounts of particulate matter.

The particulate filter 24 may then be connected to a heat source 25. The heat source 25 may be any conventional heat source known in the art. Such heat sources may include, e.g., a furnace, an electric heater, a fuel burner, etc. The heat source 25 may direct heat to any particulate filter located in the exhaust treatment system 20, such as the particulate filter 24, so as to thermally age the particulate matter deposited in the particulate filter. Alternatively, the heat source 25 may be omitted, and the engine 10 may heat the flow of exhaust, which may heat the particulate matter in the particulate filter 24. The heat source 25 may be disposed upstream from the particulate filter 24 and downstream from the engine 10. In the exemplary embodiment shown in FIG. 1, the heat source 25 is disposed upstream from the upstream injector 21 and the upstream SCR device 23, and downstream from the engine 10.

An injector 26, such as an injector described above in connection with the upstream injector 21, may be provided to inject reductant, such as urea or ammonia, into the flow of exhaust downstream from the particulate filter 24. A controller 12 may receive input via communication lines 14 from a variety of sources including, for example, sensors configured to measure temperature, speed, fuel quantity consumed, and/or other operating characteristics of the engine 10. For example, the timing of the injections by one or more of the injectors 21, 26 may be synchronized with sensory input received from a sensor 40 (FIGS. 4C, 4D, 6, and 8), such as a temperature sensor as described below, a NOx sensor, a flow sensor, a pressure sensor, a timer, or any other similar sensory device. It is further contemplated that injections may occur on a set periodic basis, in addition to or regardless of pressure or temperature conditions, if desired. In order to accomplish these specific injection events, the controller 12 may control operation of one or more of the injectors 21, 26 in response to the one or more inputs.

The controller 12 may use these inputs to form a control signal based on a pre-set control algorithm. The control signal may be transmitted from the controller 12 via the communication lines 14 to various actuation devices, such as the injectors 21, 26. The controller 12 may embody a single microprocessor or multiple microprocessors that include a means for controlling an operation of the injectors 21, 26. Numerous commercially available microprocessors can be configured to perform the functions of the controller 12. The controller 12 may include components required to run an application such as, for example, a memory, a secondary storage device, and a processor, such as a central processing unit or any other means known in the art. It is contemplated that the controller may further be communicatively coupled with one or more components of the engine 10 to change the operation thereof. Thus, the engine 10 and the injectors 21, 26 may be connected to the controller 12, and optionally, the controller 12 may be integrated into the engine 10.

Alternatively, the sensor 40 may embody both a physical sensor and a virtual sensor, which is included in the controller 12, that generates a signal based on a map-driven estimate. The physical sensor may detect and communicate to the controller 12 parameters, e.g., one or more of engine fuel/air settings, engine operating speed, engine load, engine fuel injection profile, other engine operating parameters, exhaust temperature, exhaust flow rate, a temperature of any element within the exhaust treatment system 20, etc. The virtual sensor may evaluate the signals received from one or more physical sensors, and, using relationships contained within one or more maps stored in a memory of the controller 12, may estimate an operating parameter, e.g., the expected exhaust gas $NO:NO_2$ ratio, based on the sensed parameters. Alternatively, the sensor 40 may be a physical sensor that is capable of sensing the $NO:NO_2$ ratio, an amount of NOx, etc.

An SCR device 28, such as an SCR catalyst or other type of SCR device described above in connection with the upstream SCR device 23, may be disposed downstream of the particulate filter 24 and the injector 26. Urea injected by the injector 26 may decompose to ammonia, and the SCR device 28 may facilitate a reaction between the ammonia and NOx in the flow of exhaust to produce water and nitrogen gas, thereby removing NOx from the flow of exhaust. After exiting the SCR device 28, the flow of exhaust may be output from the exhaust treatment system 20, e.g., released into the surrounding atmosphere. Alternatively, a second SCR device 28a may be disposed downstream from the SCR device 28 to receive the flow of exhaust before it is output from the exhaust treatment system 20. The second SCR device 28a may further reduce the amount of NOx in the flow of exhaust, e.g., if the volume of exhaust flow is higher.

FIG. 3 illustrates another exemplary embodiment of an exhaust treatment system 30. As shown in FIG. 3, the oxidation device 22 of the exhaust treatment system 20 shown in FIG. 1 may be replaced with a dual-leg subsystem having a first leg 30a and a second leg 30b. The SCR device 28 described above may be located downstream from the two legs 30a, 30b. The first leg 30a includes a catalyzed particulate filter 32, such as a catalyzed diesel particulate filter (CDPF). The catalyzed particulate filter 32 may be, e.g., a particulate filter, such as the particulate filters described above in connection with the particulate filter 24 (e.g., a wall flow type filter, a flow through type filter, or other type of filter) having a sponge-like or other type of porous or foam-like material that may be coated uniformly with platinum or another material for oxidizing NO, such as palladium, metal oxide, rhodium, or other precious metal. Accordingly, either a substantial portion of the exhaust or all of the exhaust flowing through the catalyzed particulate filter 32 contacts the NO oxidizing material. In the catalyzed particulate filter 32, the NO oxidizing material oxidizes NO to form $NO_2$. The $NO_2$ may react with carbon (soot) in the particulate matter to form CO and NO. As a result, the amount of carbon (soot) in the catalyzed particulate filter 32 may be reduced, thereby regenerating the catalyzed particulate filter 32.

The second leg 30b may include, in order from upstream to downstream, the oxidation device 22 and the particulate filter 24 described above in connection with the embodiment of FIG. 1. The oxidation device 22 and the particulate filter 24 in the second leg 30b may be provided in a single can or housing. Optionally, a valve 34 may be provided downstream from the particulate filter 24 in the second leg 30b. The valve 34 may control the amount of exhaust flowing through the second leg 30b and therefore may control the allocation of flow between the two legs 30a, 30b. For example, one or more sensors 40 described above in connection with the embodiment of FIG. 4C may be provided for monitoring the $NO:NO_2$ ratio of the flow of exhaust in the first leg 30a and/or the second leg 30b, e.g., downstream from the catalyzed particulate filter 32 and/or the particulate filter 24. Alternatively, the valve 34 may be omitted, and the catalyzed particulate filter 32 in the first leg 30a may be sized with respect to the oxidation device 22 and the particulate filter 24 in the second leg 30b to control the allocation of flow between the two legs 30a, 30b. For example, the catalyzed particulate filter 32 in the first leg 30a may be sized so that approximately 50% of the total flow of exhaust is directed to the catalyzed particulate filter 32. Alternatively, the catalyzed particulate filter 32 may be sized so that approximately 45%, 55%, 60%, etc., or any percentage therebetween of the flow of exhaust is directed to the catalyzed particulate filter 32. The remaining exhaust flows to the second leg 30b. The SCR device 28 and the second SCR device 28a, described above in connection with the embodiment of FIG. 1, may be located downstream from the two legs 30a, 30b. Alternatively, the second SCR device 28a may be omitted.

FIGS. 4A-4D illustrate alternative exemplary embodiments of the first leg 30a of the exhaust treatment system 30 of FIG. 3. In a first leg 30a' shown in FIG. 4A, the catalyzed particulate filter 32 of the first leg 30a shown in FIG. 3 may be replaced by, in order from upstream to downstream, the oxidation device 22 and the particulate filter 24 described above in connection with the embodiment of FIG. 1. Alternatively, in a first leg 30a'' shown in FIG. 4B, the oxidation device 22, described above in connection with the embodiment of FIG. 1, may be disposed upstream of the catalyzed particulate filter 32 of the first leg 30a shown in FIG. 3. As another alternative, in a first leg 30a''' shown in FIG. 4C, the upstream injector 21, described above in connection with the embodiment of FIG. 1, may be disposed upstream of the catalyzed particulate filter 32 of the first leg 30a shown in FIG. 3. Alternatively, the upstream injector 21 may be disposed upstream of the first and second legs 30a''', 30b and downstream of the heat source 25. The sensor 40 may be provided for monitoring a temperature of the catalyzed particulate filter 32. Signals indicating the sensed temperature are transmitted from the sensor 40 to the controller 12 via the communication line 14. As a further alternative, in a first leg 30a'''' shown in FIG. 4D, the upstream injector 21 and the upstream SCR device 23, described above in connection with the embodiment of FIG. 1, may be disposed upstream of the catalyzed particulate filter 32 of the first leg 30a shown in FIG. 3. The upstream SCR device 23 may be close-coupled to the catalyzed particulate filter 32. The sensor 40 described above in connection with the embodiment of FIG. 4C may be provided for monitoring the temperature of the catalyzed particulate filter 32.

Figure 5:
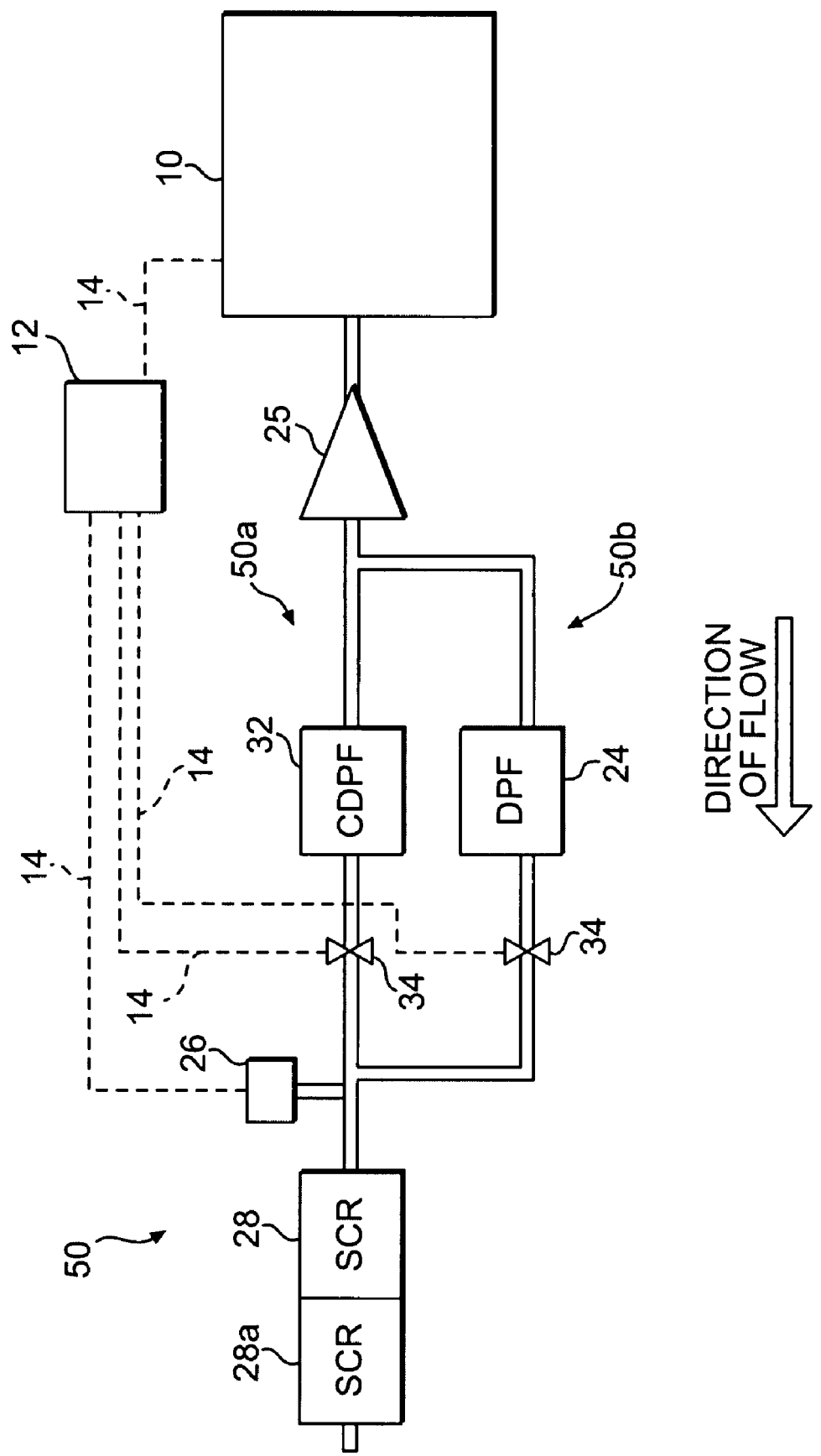
FIG. 5 is a diagrammatic illustration of another exemplary disclosed engine and exhaust treatment system having two legs.

FIG. 5 illustrates a further exemplary embodiment of an exhaust treatment system 50 in which the dual-leg subsystem of the exhaust treatment system 30 shown in FIG. 3 may be replaced with a dual-leg subsystem having a first leg 50a and a second leg 50b. The first leg 50a may include, in order from upstream to downstream, the catalyzed particulate filter 32 and the valve 34, described above in connection with the embodiment of FIG. 3. The second leg 50b may include the particulate filter 24 and the valve 34 described above in connection with the embodiments of FIGS. 1 and 3. The SCR device 28 and the second SCR device 28a, described above in connection with the embodiment of FIG. 1, may be located downstream from the two legs 50a, 50b. Alternatively, the second SCR device 28a may be omitted. As another alternative, for example, when a lesser reduction of particulate matter from the flow of exhaust is necessary, the particulate filter 24 in the second leg 50b may be omitted. As yet another alternative, for example, when the flow of exhaust from the engine 10 has a low amount of particulate matter, the catalyzed particulate filter 32 in the first leg 50a may be replaced by an oxidization device, such as a DOC or other type of oxidation device described above in connection with the oxidation device 22 of FIG. 1, and the particulate filter 24 in the second leg 50b may be omitted.

Figure 6:
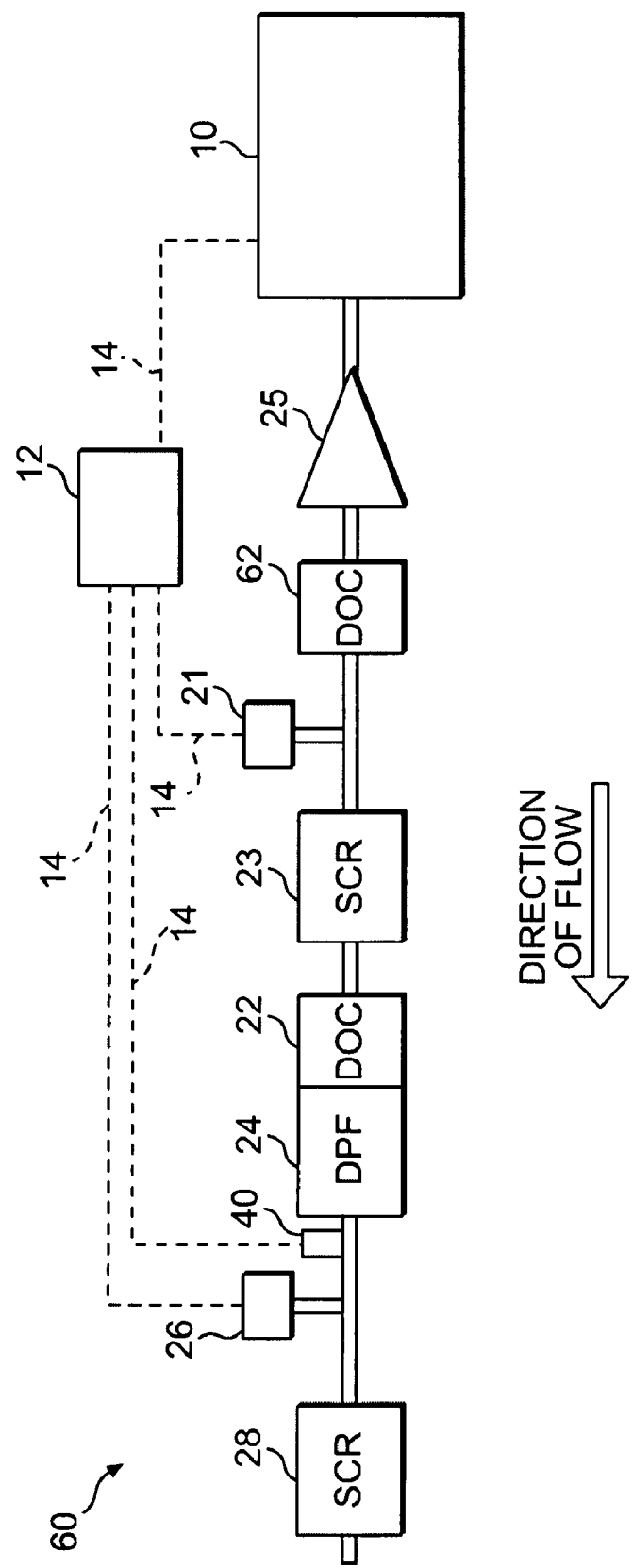
FIG. 6 is a diagrammatic illustration of another exemplary disclosed engine and exhaust treatment system.

FIG. 6 illustrates yet another exemplary embodiment of an exhaust treatment system 60. As shown in FIG. 6, the exhaust treatment system 20 shown in FIG. 1 may further include an upstream oxidation device 62, such as a DOC or other type of oxidation device described above in connection with the oxidation device 22 of FIG. 1. Downstream from the upstream oxidation device 62, the exhaust treatment system 60 may further include, in order from upstream to downstream, the upstream injector 21, the upstream SCR device 23, the oxidation device 22, the particulate filter 24, the injector 26, and the SCR device 28 described above in connection with the embodiment of FIG. 1. Alternatively, the particulate filter 24 may be omitted. The upstream oxidation device 62 and the oxidation device 22 may be similar, but may have different percentages of the holes 22a (FIG. 2) coated with the NO oxidizing material. For example, the upstream oxidation device 62 may have approximately 25% of the holes 22a coated, and the upstream oxidation device 72 in the second leg 70b may have approximately 65% to 100% of the holes 22a coated. The sensor 40 described above in connection with the embodiment of FIG. 4C may be provided for monitoring the temperature and/or the NO:$NO_2$ ratio of the flow of exhaust downstream from the particulate filter 24. Alternatively, the sensor 40 may be provided anywhere downstream from the engine 10, e.g., between the oxidation device 22 and the SCR device 28.

Figure 7:
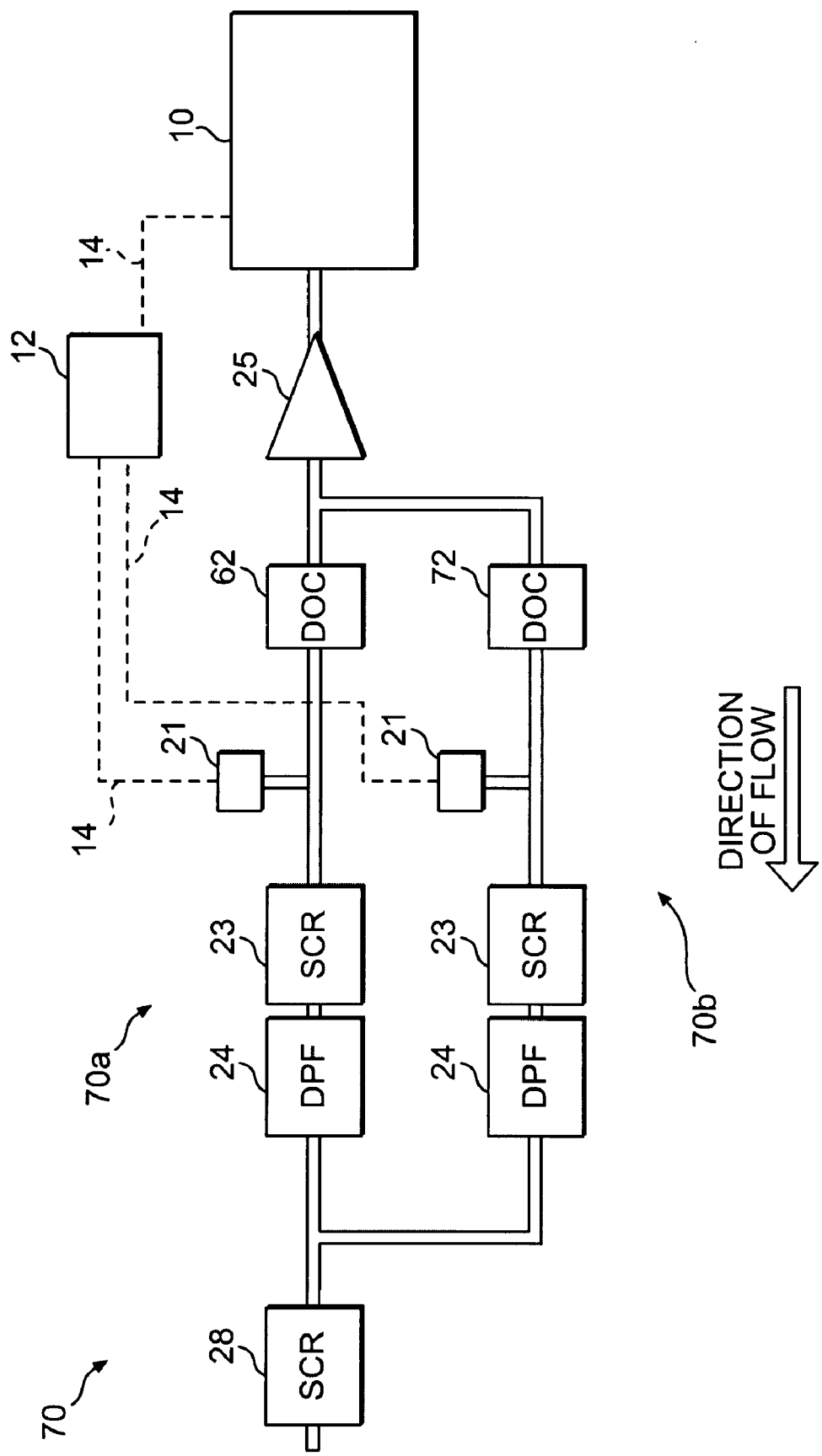
FIG. 7 is a diagrammatic illustration of yet another exemplary disclosed engine and exhaust treatment system having two legs.

FIG. 7 illustrates a further exemplary embodiment of an exhaust treatment system 70. As shown in FIG. 7, the exhaust treatment system 70 may include a dual-leg subsystem having a first leg 70a and a second leg 70b. The first leg 70a includes, in order from upstream to downstream, the upstream oxidation device 62, the upstream injector 21, the upstream SCR device 23, and the particulate filter 24 described above in connection with the embodiments of FIGS. 1 and 6. The second leg 70b also includes, in order from upstream to downstream, the upstream injector 21, the upstream SCR device 23, and the particulate filter 24, which are identical or similar to the like elements in the first leg 70a. An upstream oxidation device 72 is located upstream from the upstream injector 21 in the second leg 70b. The upstream oxidation device 62 in the first leg 70a and the upstream oxidation device 72 in the second leg 70b may be similar, but may have different percentages of the holes 22a (FIG. 2) coated with the NO oxidizing material. For example, the upstream oxidation device 62 in the first leg 70a may have approximately 25% of the holes 22a coated, and the upstream oxidation device 72 in the second leg 70b may have approximately 65% to 100% of the holes 22a coated. The SCR device 28, described above in connection with the embodiment of FIG. 1, may be located downstream from the two legs 70a, 70b.

Figure 8:
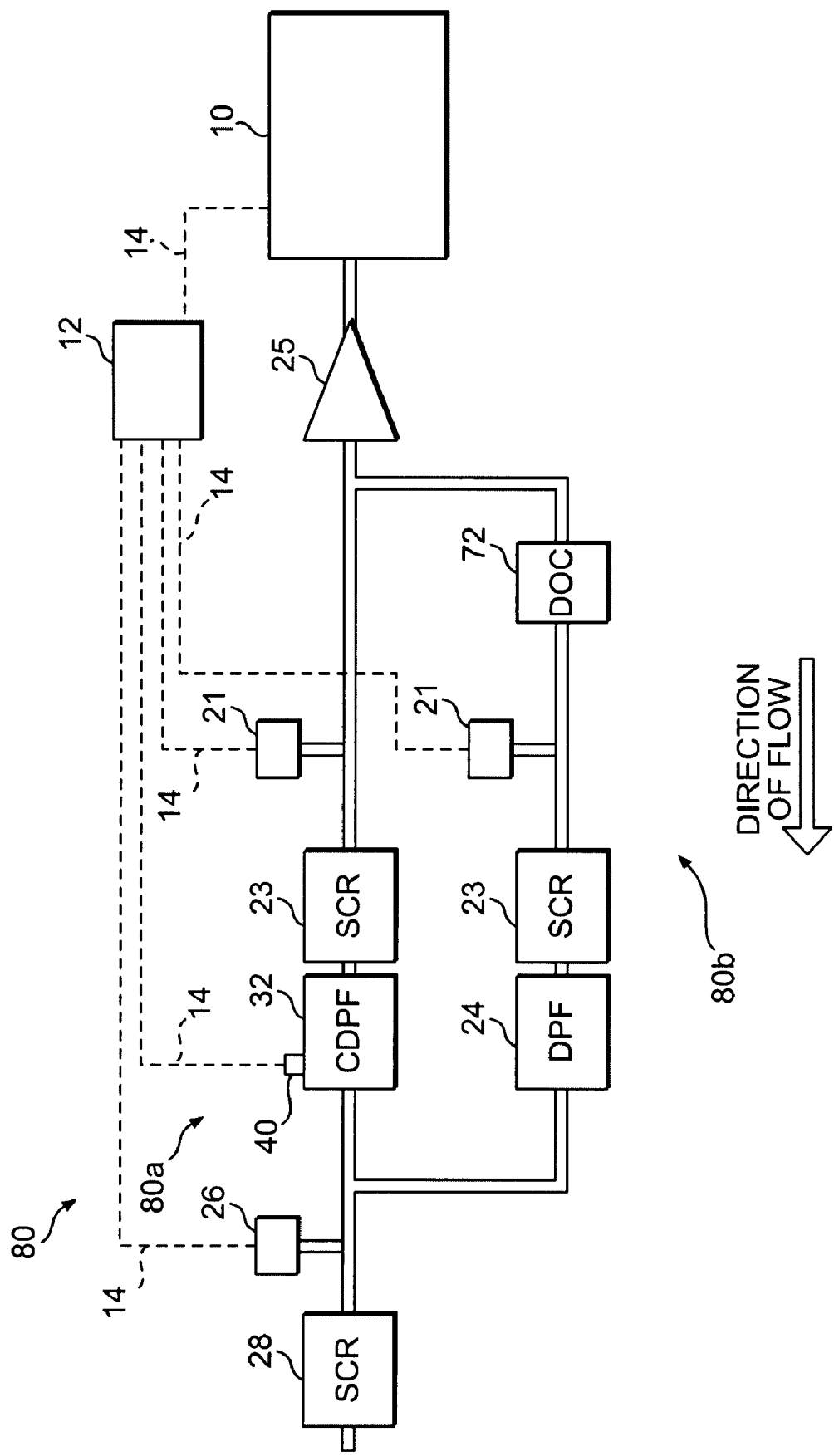
FIG. 8 is a diagrammatic illustration of a further exemplary disclosed engine and exhaust treatment system having two legs.

FIG. 8 illustrates a further exemplary embodiment of an exhaust treatment system 80. As shown in FIG. 8, the exhaust treatment system 80 may include a dual-leg subsystem having a first leg 80a and a second leg 80b. The first leg 80a may be similar to the first leg 30a'''' of the exhaust treatment system 30 shown in FIGS. 3 and 4D, i.e., the first leg 80a may include, from upstream to downstream, the upstream injector 21, the upstream SCR device 23, and the catalyzed particulate filter 32 connected to the sensor 40. The second leg 80b may be similar to the second leg 70b of the exhaust treatment system 70 shown in FIG. 7, i.e., the second leg 80b may include, from upstream to downstream, the upstream oxidation device 72, the upstream injector 21, the upstream SCR device 23, and the particulate filter 24. The injector 26 and the SCR device 28 described above may be located downstream from the two legs 80a, 80b.

Figure 9A:
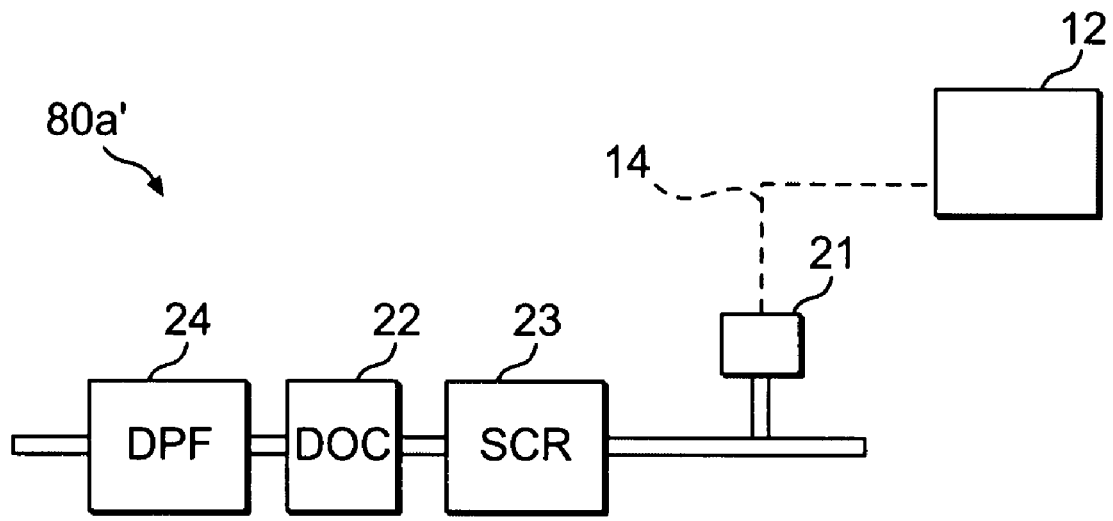
FIGS. 9A and 9B are diagrammatic illustrations of exemplary disclosed first legs of the exhaust treatment system of FIG. 8.
Figure 9B:
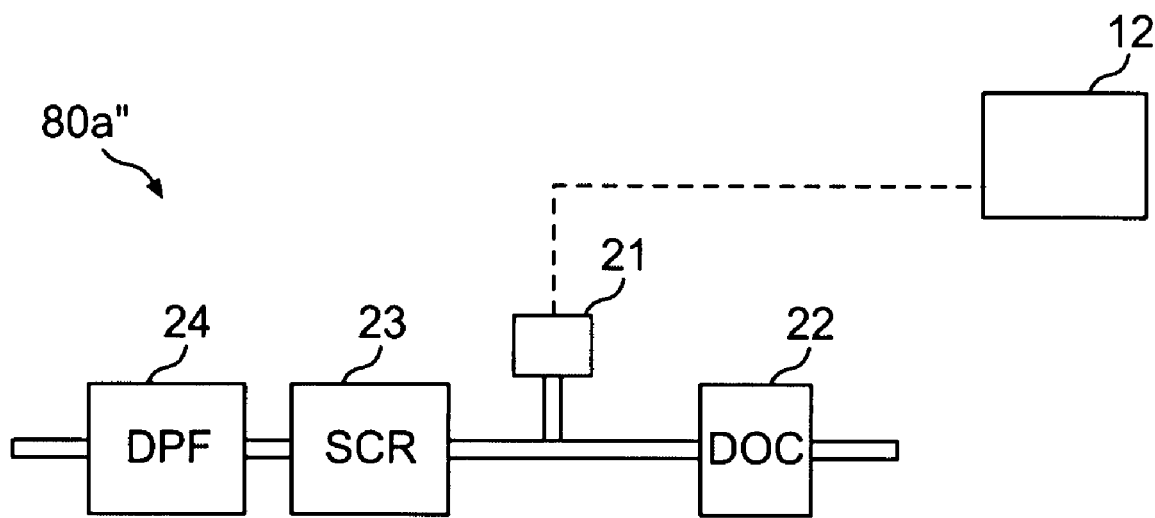
Figure 9C:
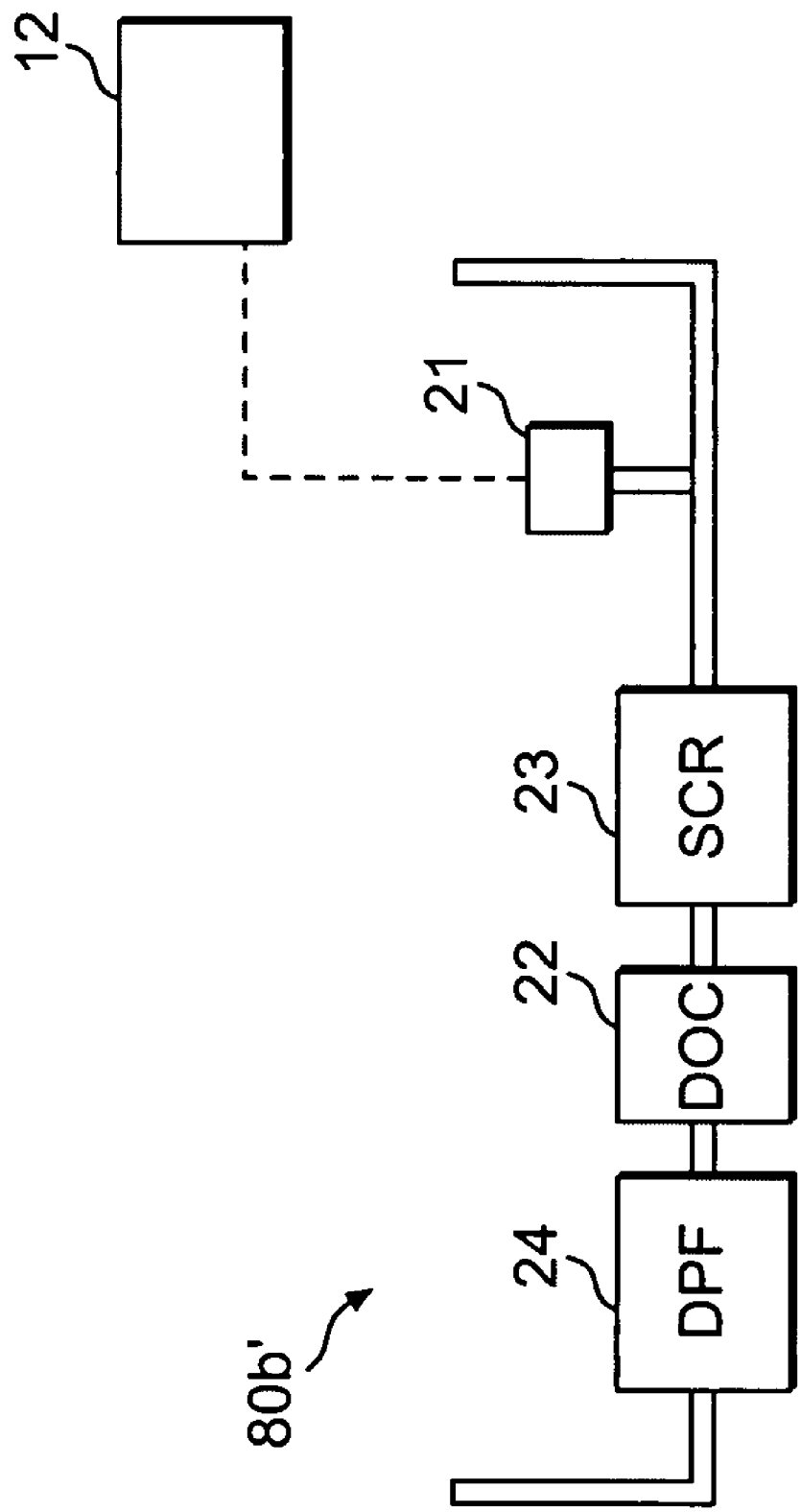
FIG. 9C is a diagrammatic illustration of an exemplary disclosed second leg of the exhaust treatment system of FIG. 8.

FIGS. 9A and 9B illustrate alternative exemplary embodiments of the first leg 80a of the exhaust treatment system 80 of FIG. 8. As shown in FIG. 9A, a first leg 80a' may include, from upstream to downstream, the upstream injector 21, the upstream SCR device 23, the oxidation device 22, and the particulate filter 24 as provided in the embodiment of FIG. 1. As shown in FIG. 9B, a first leg 80a'' may include, from upstream to downstream, the upstream oxidation device 62, the upstream injector 21, the upstream SCR device 23, and the particulate filter 24 as described above in connection with the embodiment of FIG. 7. FIG. 9C illustrates an alternative exemplary embodiment of the second leg 80b of the exhaust treatment system 80 of FIG. 8. As shown in FIG. 9C, a second leg 80b' may include, from upstream to downstream, the upstream injector 21, the upstream SCR device 23, the oxidation device 22, and the particulate filter 24 as provided in the embodiment of FIG. 1.

INDUSTRIAL APPLICABILITY

The disclosed exhaust treatment system may be provided in any machine or powered system that includes a power source producing a flow of exhaust, such as an engine. The disclosed exhaust treatment system may increase the amount of $NO_2$ relative to NO in the flow of exhaust upstream of the SCR device so that the SCR device can more quickly and efficiently reduce the amount of NOx. The operation of the exhaust treatment system will now be explained.

According to the embodiment of the exhaust treatment system 20 shown in FIG. 1, the flow of exhaust from the engine 10 may be heated by the heat source 25 before being directed to the oxidation device 22. Optionally, e.g., during cold start conditions, reductant may be injected into the flow of exhaust by the upstream injector 21 and then the flow of reductant and exhaust may be directed to the upstream SCR device 23 to reduce the amount of NOx in the flow of exhaust before being directed to the oxidation device 22. Then, the flow of exhaust may be directed to the particulate filter 24 where particulate matter may be removed. After exiting the particulate filter 24, reductant is injected into the flow of exhaust by the injector 26, and the flow of exhaust is directed to the SCR device 28 and optionally the second SCR device 28a, which reduce the amount of NOx in the flow of exhaust.

Efficiency of the NOx reduction by the SCR device 28 may be at least partially dependent on the ratio of $NO_2$ to NOx in the flow of exhaust. In particular, NOx reduction by the SCR device 28 may be faster and more efficient when the ratio of $NO_2$ to NOx in the flow of exhaust is approximately 50:50. According to an exemplary embodiment, the oxidation device 22 may convert some of the NO in the flow of exhaust to $NO_2$ so that the $NO:NO_2$ ratio is closer to 50:50. For example, approximately 50% to 75% of the holes 22a of the oxidation device 22 may be coated with platinum. In one embodiment, approximately 75% of the holes 22a of the oxidation device 22 may be coated with platinum. As a result, the exhaust treatment system 20 shown in FIG. 1 may reduce particulate matter and may provide a greater reduction in NOx before releasing the flow of exhaust to the surrounding atmosphere.

The oxidation device 22 also allows the regeneration of the particulate filter 24. The oxidation device 22 increases the amount of $NO_2$ such that $NO_2$ reacts with carbon (soot) in the particulate matter to form CO and NO. As a result, the amount of carbon (soot) in the particulate filter 24 is reduced, thereby regenerating the particulate filter 24 and reducing the risk of having the particulate matter build up and clog the particulate filter 24.

According to the embodiment of the exhaust treatment system 30 shown in FIG. 3, the flow of exhaust from the engine 10 may be heated by the heat source 25 before being directed to the first and second legs 30a, 30b. A first portion of the exhaust flows through the first leg 30a, where all or a substantial amount of the first portion of the exhaust contacts the platinum coating of the catalyzed particulate filter 32 to convert some of the NO to $NO_2$. The increase in $NO_2$ may allow the catalyzed particulate filter 32 to regenerate as described above and may provide an increased amount of $NO_2$ from the first leg 30a to the SCR device 28. A second portion of the exhaust flows through the second leg 30b, where the second portion of the exhaust is directed to the partially-loaded oxidation device 22. In an exemplary embodiment, the oxidation device 22 has a percentage less than 50%, e.g., approximately 25%, of the holes 22a coated with platinum. Accordingly, the oxidation device 22 may convert some of the NO to $NO_2$ in the second portion of the exhaust. The increase in $NO_2$ may allow the regeneration of the particulate filter 24 in the second leg 30b, as described above in connection with the oxidation device 22 and the particulate filter 24 of the embodiment shown in FIG. 1. The increase in $NO_2$ may also allow the SCR device 28 to perform NOx reduction faster and more efficiently as described above. After exiting the oxidation device 22, the second portion of the exhaust may be directed to the particulate filter 24 where particulate matter may be removed.

The respective portions of exhaust from the first and second legs 30a, 30b are combined, and reductant is injected by the injector 26 into the combined flow. Then, the combined flow is directed to the SCR device 28, which reduces the amount of NOx in the combined flow. According to the embodiments shown in FIGS. 3 and 4A-4D, the components in the first leg 30a, 30a', 30a'', 30a''', 30a'''' may be sized relative to the oxidation device 22 and the particulate filter 24 in the second leg 30b such that the combined flow from the first leg 30a, 30a', 30a'', 30a''', 30a'''' and the second leg 30b has a $NO:NO_2$ ratio that is closer to 50:50. Alternatively or in addition, the sensor 40 and/or the valve 34 may be provided in the second leg 30b to also control the respective amounts of flow in the two legs 30a, 30a', 30a'', 30a''', 30a'''' and 30b. As a result, the reduction of NOx in the SCR device 28 may be more efficient and faster. The exhaust treatment system 30 may reduce particulate matter (with the components in the first leg 30a, 30a', 30a'', 30a''', 30a'''' and the particulate filter 24 in the second leg 30b), and may provide a greater reduction in NOx before releasing the flow of exhaust to the surrounding atmosphere.

Alternatively, one or more of the sensors 40 may be provided, e.g., in one or both of the two legs 30a, 30a', 30a'', 30a''', 30a'''' and 30b or between the two legs and the SCR device 28. Accordingly, the controller 12 may adjust the allocation of flow between the two legs 30a, 30a', 30a'', 30a''', 30a'''' and 30b, e.g., by controlling the valve 34, based on a sensed condition (e.g., the $NO:NO_2$ ratio) to provide more accurate control of the amount of $NO_2$ supplied to the SCR device 28. Closed loop control of the ratio of $NO:NO_2$ in the exhaust may be achieved.

Figure 4A:
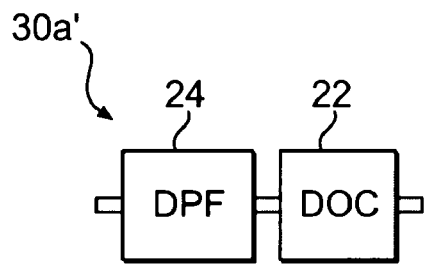
FIGS. 4A-4D are diagrammatic illustrations of exemplary disclosed first legs of the exhaust treatment system of FIG. 3.

According to the embodiment shown in FIG. 4A, the first portion of the exhaust may flow through the first leg 30a', where the first portion of the exhaust may be directed to the partially-loaded oxidation device 22 and then the particulate filter 24. In the exemplary embodiment, the oxidation device 22 may have approximately 50% or a lower percentage of the holes 22a coated with platinum. Accordingly, the oxidation device 22 may convert some of the NO to $NO_2$ in the first portion of the exhaust. The increase in $NO_2$ may allow the regeneration of the particulate filter 24 in the first leg 30a', as described above in connection with the oxidation device 22 and the particulate filter 24 of the embodiment shown in FIG. 1. The increase in $NO_2$ may also allow the SCR device 28 to perform NOx reduction faster and more efficiently as described above. After exiting the oxidation device 22, the first portion of the exhaust may be directed to the particulate filter 24 where particulate matter may be removed.

Figure 4B:
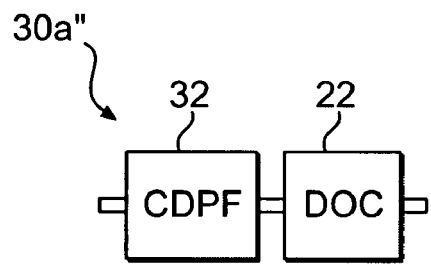

According to the embodiment shown in FIG. 4B, the first portion of the exhaust may flow through the first leg 30a'', where the first portion of the exhaust may be directed to the partially-loaded oxidation device 22 and then the catalyzed particulate filter 32. The partially-loaded oxidation device 22 may have approximately 50% or a lower percentage of the holes 22a coated with platinum. Accordingly, the oxidation device 22 may convert some of the NO to $NO_2$ in the first portion of the exhaust. The increase in $NO_2$ may allow the regeneration of the catalyzed particulate filter 32 and may allow NOx reduction by the SCR device 28 to be performed faster and more efficiently as described above. In addition, the catalyzed particulate filter 32 may allow a substantial amount or all of the first portion of the exhaust to contact the platinum coating of the filter 32, thereby converting some of the NO to $NO_2$. The increase in $NO_2$ may allow the catalyzed particulate filter 32 to regenerate as described above and may allow NOx reduction by the SCR device 28 to be performed faster and more efficiently as described above.

Figure 4C:
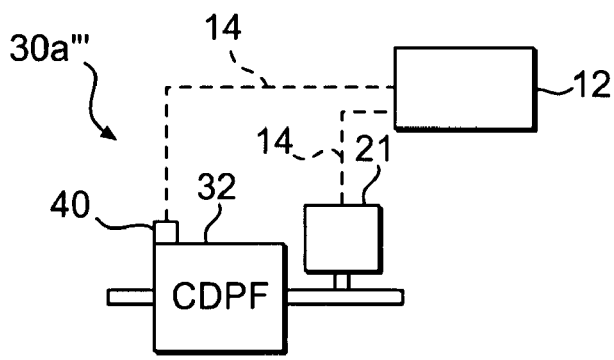

According to the embodiment shown in FIG. 4C, the first portion of the exhaust may flow through the first leg 30a''', where reductant may be injected by the upstream injector 21. Then, the flow of reductant and the first portion of the exhaust may be directed to the catalyzed particulate filter 32. The catalyzed particulate filter 32 may allow a substantial amount or all of the first portion of the exhaust to contact the platinum coating of the filter 32, thereby converting some of the NO to $NO_2$. The increase in $NO_2$ may allow the catalyzed particulate filter 32 to regenerate as described above and may allow NOx reduction by the SCR device 28 to be performed faster and more efficiently as described above.

According to an exemplary embodiment, the controller 12 may send a signal to the upstream injector 21 inject reductant when a predetermined condition is satisfied, e.g., during cold start conditions and/or when a temperature measured by the sensor 40 monitoring the temperature of the catalyzed particulate filter 32 is within a predetermined range (e.g., approximately 200° C. to 300° C., approximately 200° C. to 350° C., or other temperature range in which NOx reduction in the SCR device 28 is dependent on the ratio of $NO:NO_2$). When the predetermined condition is satisfied, the controller 12 may send a signal to the upstream injector 21 to inject reductant into the first portion of the exhaust upstream from the catalyzed particulate filter 32. The addition of reductant may reduce the amount of NOx in the first portion of the exhaust that contacts the platinum coating in the catalyzed particulate filter 32.

The controller 12 may be configured to determine a desired (or target) amount of reductant to inject with the upstream injector 21 based on one or more mappings correlating the sensed temperature of the catalyzed particulate filter 32 and the desired amount of reductant to inject. In addition, the mapping(s) may determine the desired amount of reductant to inject based on a desired amount of $NO_2$ to supply to the SCR device 28, e.g., to reach a desired $NO:NO_2$ ratio of 50:50. The controller 12 may also determine the amount of reductant based on other factors, e.g., characteristics of the catalyzed particulate filter 32, an estimated amount of $NO_2$ in the second portion of the exhaust from the second leg 30*b*, etc. Accordingly, by using the mapping(s), the controller 12 may adjust the amount of reductant to inject into the first leg 30*a'''* based on a sensed condition (e.g., the temperature of the catalyzed particulate filter 32) to provide more accurate control of the amount of $NO_2$ supplied to the SCR device 28. Closed loop control of the ratio of $NO:NO_2$ in the first portion of the exhaust may be achieved. The determination of whether and how much reductant to inject with the upstream injector 21 is adjusted based on the sensed temperature of the catalyzed particulate filter 32.

Figure 4D:
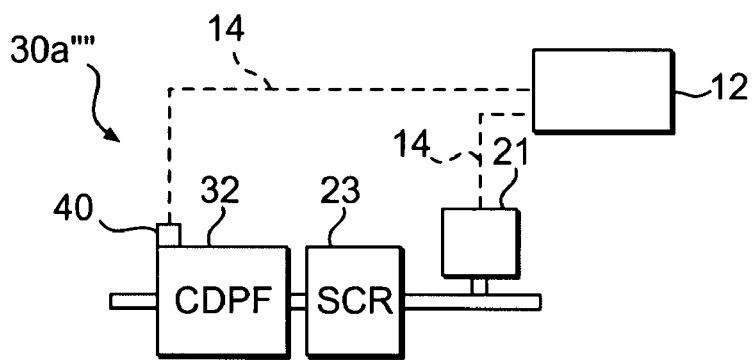

According to the embodiment shown in FIG. 4D, the first portion of the exhaust may flow through the first leg 30*a''''*, where reductant may be injected by the upstream injector 21. Then, the flow of reductant and the first portion of the exhaust may be directed to the upstream SCR device 23 to reduce the amount of NOx in the flow of exhaust before being directed to the catalyzed particulate filter 32. The catalyzed particulate filter 32 may allow a substantial amount or all of the first portion of the exhaust to contact the platinum coating of the filter 32, thereby converting some of the NO to $NO_2$. The increase in $NO_2$ may allow the catalyzed particulate filter 32 to regenerate as described above and may allow NOx reduction by the SCR device 28 to be performed faster and more efficiently as described above.

The controller 12 may send a signal to the upstream injector 21 to inject reductant into the first portion of the exhaust when a predetermined condition is satisfied, as described above in connection with the embodiment shown in FIG. 4C. The addition of reductant upstream from the upstream SCR device 23 may reduce the amount of NOx in the first portion of the exhaust. Since there is less NOx (which includes NO and $NO_2$), there is proportionally less NO and $NO_2$ supplied to the catalyzed particulate filter 32. Therefore, the catalyzed particulate filter 32 outputs less $NO_2$ than without the addition of reductant.

The controller 12 may also be configured to adjust the amount of reductant injected by the upstream injector 21, as described above in connection with the embodiment shown in FIG. 4C. Accordingly, by using the mapping(s), the controller 12 may adjust the amount of reductant to inject into the first leg 30*a''''* based on a sensed condition (e.g., the temperature of the catalyzed particulate filter 32) to provide more accurate control of the amount of $NO_2$ supplied to the SCR device 28. Closed loop control of the ratio of $NO:NO_2$ in the first portion of the exhaust may be achieved. The determination of whether and how much reductant to inject with the upstream injector 21 is adjusted based on the sensed temperature of the catalyzed particulate filter 32.

According to the embodiment of the exhaust treatment system 50 shown in FIG. 5, the flow of exhaust from the engine 10 may be heated by the heat source 25 before being directed to the first and second legs 50*a*, 50*b*. A first portion of the exhaust flows through the first leg 50*a*, where all or a substantial amount of the first portion of the exhaust contacts the platinum coating of the catalyzed particulate filter 32 to convert some of the NO to $NO_2$. The increase in $NO_2$ may allow the catalyzed particulate filter 32 to regenerate as described above and may provide an increased amount of $NO_2$ from the first leg 50*a* to the SCR device 28. A second portion of the exhaust flows through the second leg 50*b*, where the second portion of the exhaust is directed to the particulate filter 24. The particulate filter 24 may remove particulate matter from the second portion of the exhaust. Then, the respective portions of the exhaust from the first and second legs 50*a*, 50*b* are combined, and reductant is injected by the injector 26 into the combined flow. The combined flow is directed to the SCR device 28, which reduces the amount of NOx in the combined flow.

The valves 34 in the first and second legs 50*a*, 50*b* may be controlled by the controller 12 to control the respective amounts of flow through the legs 50*a*, 50*b*. In an exemplary embodiment, the controller 12 may control the respective amounts of flow through the valves 34 to provide a $NO:NO_2$ ratio that is approximately 50:50 in the flow of exhaust directed to the SCR device 28. As a result, the reduction of NOx in the SCR device 28 may be more efficient and faster. The exhaust treatment system 50 may reduce particulate matter (with the catalyzed particulate filter 32 in the first leg 50*a* and the particulate filter 24 in the second leg 50*b*), and may provide a greater reduction in NOx before releasing the flow of exhaust to the surrounding atmosphere.

In addition, the controller 12 may control the valves 34 such that the valves 34 in the first and second legs 50*a*, 50*b* may be closed simultaneously. When the valves 34 are closed simultaneously, back pressure is created in the engine 10, which raises the temperature of the flow of exhaust. The higher temperature exhaust may be used to regenerate the catalyzed particulate filter 32 in the first leg 50*a* and the particulate filter 24 in the second leg 50*b*. Accordingly, the heat source 25 may be omitted.

According to the embodiment of the exhaust treatment system 60 shown in FIG. 6, the flow of exhaust from the engine 10 may be heated by the heat source 25 before being directed to the partially-loaded upstream oxidation device 62. In an exemplary embodiment, the upstream oxidation device 62 has a percentage less than 50%, e.g., approximately 25%, of the holes 22*a* coated with platinum. Alternatively, the upstream oxidation device 62 may have approximately 50% or another percentage less than 100% of the holes 22*a* coated with platinum. Accordingly, the oxidation device 22 may convert some of the NO to $NO_2$ in the second portion of the exhaust. Then, reductant may be injected into the flow of exhaust by the upstream injector 21 and the flow of reductant and exhaust may be directed to the upstream SCR device 23 to reduce the amount of NOx in the flow of exhaust. Since the upstream oxidation device 62 converts some of the NO to $NO_2$ upstream from the upstream SCR device 23, greater NOx reduction efficiency may be achieved with the upstream SCR device 23.

The flow of exhaust is then directed to the partially-loaded oxidation device 22. In an exemplary embodiment, the oxidation device 22 has a percentage equal to or greater than 50%, e.g., approximately 65%, of the holes 22a coated with platinum. Alternatively, the oxidation device 22 may have approximately 75% or another percentage less than 100% of the holes 22a coated with platinum. Accordingly, the oxidation device 22 may convert some of the NO to $NO_2$ in the flow of exhaust. The oxidation device 22 may convert more NO to $NO_2$ than the upstream oxidation device 62 since the oxidation device 22 has a greater percentage of the holes 22a coated with platinum. Then, optionally, the flow of exhaust may be directed to the particulate filter 24 where particulate matter may be removed. The increase in $NO_2$ by the oxidation device 22 may allow the regeneration of the particulate filter 24, as described above in connection with the oxidation device 22 and the particulate filter 24 of the embodiment shown in FIG. 1.

After exiting the particulate filter 24, reductant is injected into the flow of exhaust by the injector 26, and the flow of exhaust is directed to the SCR device 28, which reduces the amount of NOx in the flow of exhaust. The remaining $NO_2$ in the flow of exhaust may be used by the SCR device 28 to reduce the amount of NOx with greater efficiency. In an exemplary embodiment, the components of the exhaust treatment system 60, e.g., the upstream oxidation device 62, the upstream SCR device 23, the oxidation device 22, and the particulate filter 24, may be configured to provide a $NO:NO_2$ ratio in the flow of exhaust to the SCR device 28 of approximately 50:50.

Alternatively or in addition, to provide a $NO:NO_2$ ratio in the flow of exhaust to the SCR device 28 of approximately 50:50 or other optimum ratio, the sensor 40 may be provided, e.g., downstream of the oxidation device 22. The sensor 40 allows the controller 12 to determine the $NO:NO_2$ ratio and to provide closed loop control of the dosing of the reductant to the upstream SCR device 23 by the upstream injector 21, thereby allowing the conversion efficiency of the upstream SCR device 23 to be controlled. The sensor 40 may transmit a signal to the controller 12 indicating the $NO:NO_2$ ratio in the flow of exhaust. For example, the sensor 40 may include the virtual sensor described above and one or more physical sensors. Then, the controller 12 may determine the timing and amount of reductant injected by the upstream injector 21 to control the $NO:NO_2$ ratio of the flow of exhaust supplied to the SCR device 28, e.g., by setting the $NO:NO_2$ ratio closer to 50:50. For example, one or more mappings may stored in the memory of the controller 12. The mappings may be used to determine a sensed $NO:NO_2$ ratio of the flow of exhaust based on the characteristics sensed by the physical sensors, e.g., the temperature of the flow of exhaust, space velocity, air flow to the engine 10, etc. Then, the mappings may be used to determine the timing and amount of reductant to inject based on the sensed $NO:NO_2$ ratio in the flow of exhaust in order to maintain the $NO:NO_2$ ratio near 50:50. Thus, closed loop feedback control of the ratio of $NO:NO_2$ in the flow of exhaust may be achieved. As a result, the reduction of NOx in the SCR device 28 may be more efficient and faster over a wider range of operating conditions (e.g., exhaust temperatures). Furthermore, the exhaust treatment system 60 may reduce particulate matter in the flow of exhaust with the particulate filter 24 and may provide a greater reduction in NOx before releasing the flow of exhaust to the surrounding atmosphere. Also, as the components of the exhaust treatment system 60 age, the closed loop feedback control on the dosing of reductant to the upstream SCR device 23 can compensate for the change in conversion efficiency of the other components, such as the oxidation devices 62, 22, thereby maintaining an optimum $NO:NO_2$ ratio to the SCR device 28. The closed loop feedback control also allows the $NO:NO_2$ ratio to the SCR device 28 to be actively controlled.

Some ammonia may remain in the flow of exhaust after passing through the upstream SCR device 23, e.g., in situations when there is an overdose of reductant by the injectors 21, 26 or when the oxidation device 22 is unable to convert all of the ammonia. The SCR device 28 may remove the remaining ammonia (i.e., the ammonia slip) by reacting the ammonia with the NOx in the flow of exhaust to form $N_2$ and water. Furthermore, the sensor 40 may also be used to determine whether the amount of reductant injected by the upstream injector 21 is not within a desired range, e.g., too high or too low, so that ammonia slip may be reduced.

According to the embodiment of the exhaust treatment system 70 shown in FIG. 7, the flow of exhaust from the engine 10 may be heated by the heat source 25 before being directed to the first and second legs 70a, 70b. A first portion of the exhaust flows through the first leg 70a, where a percentage of the first portion of the exhaust contacts the platinum coating in the upstream oxidation device 62 in the first leg 70a to convert some NO to $NO_2$. The percentage is determined based on the number of the holes 22a of the upstream oxidation device 62 that are coated with platinum. At the same time, a second portion of the exhaust flows through the second leg 70b, where a percentage of the second portion of the exhaust contacts the platinum coating in the upstream oxidation device 72 in the second leg 70b to convert NO to $NO_2$. The percentage is determined based on the number of the holes 22a of the upstream oxidation device 72 that are coated with platinum. Accordingly, an increased amount of $NO_2$ may be provided in the first and second legs 70a, 70b by the respective upstream oxidation devices 62, 72.

Downstream from the upstream oxidation devices 62, 72 in the respective first and second legs 70a, 70b, reductant may be injected into the flow of exhaust by the respective upstream injectors 21. The flow of reductant and exhaust may be directed to the respective upstream SCR devices 23 to reduce the amount of NOx in the flow of exhaust. The increase in $NO_2$ by the upstream oxidation devices 62, 72 may allow the upstream SCR devices 23 to perform NOx reduction faster and more efficiently as described above. The respective flows of exhaust are then directed to the particulate filters 24 in the respective first and second legs 70a, 70b, and the particulate filters 24 may remove particulate matter from the respective flows of exhaust. In addition, some of the $NO_2$ introduced by the upstream oxidation devices 62, 72 into the flows of exhaust in the respective first and second legs 70a, 70b may be used by the particulate filter 24 for regeneration, as described above in connection with the oxidation device 22 and the particulate filter 24 of the embodiment shown in FIG. 1. The respective portions of exhaust from the first and second legs 70a, 70b are combined and directed to the SCR device 28, which reduces the amount of NOx in the combined flow.

The upstream oxidation devices 62, 72 may include different percentages of holes 22a coated with platinum. In an exemplary embodiment, a percentage less than 50%, e.g., 25%, of the holes 22a of the upstream oxidation device 62 in the first leg 70a may be coated with platinum, and a percentage greater than 50%, e.g., 65%, of the holes 22a of the upstream oxidation device 72 in the second leg 70b may be coated with platinum. Alternatively, the upstream oxidation device 72 may have approximately 75% or another percentage less than 100% of the holes 22a coated with platinum. The controller 12 may send signals to the upstream injectors 21 to control the respective amounts of reductant injected into the respective first and second legs 70a, 70b, e.g., to provide a $NO:NO_2$ ratio of approximately 50:50, thereby providing more efficient and faster NOx reduction in the SCR device 28. As a result, the exhaust treatment system 50 may reduce particulate matter (with the particulate filters 24 in the first and second legs 70a, 70b), and may provide a greater reduction in NOx before releasing the flow of exhaust to the surrounding atmosphere.

In a dual-leg exhaust treatment system, such as the exhaust treatment systems 30, 50, 70, 80 shown in FIGS. 3, 5, 7, and 8, the particulate filter 24 and/or the catalyzed particulate filter 32 in one or both of the legs may be a flow through type filter, as described above. Compared to wall flow type filters, flow through type filters have less back pressure. When back pressure builds up upstream from the flow through type filter, there may be a difference between the target or desired amount of flow through the respective leg and the actual amount of flow through the leg. The difference in target/desired and actual amounts of flow may cause a deviation from the target $NO:NO_2$ ratio, e.g., 50:50, and the actual $NO:NO_2$ ratio to the SCR device 28. Therefore, when the particulate filter 24 and/or the catalyzed particulate filter 32 in one or both of the legs is a flow through type filter, the risk of having excessive back pressure is lower, thereby providing a more efficient exhaust treatment system.

One or more characteristics of the exhaust treatment system 20, 30, 50, 60, 70, 80, e.g., the percentage of holes 22a coated in the oxidizing device 22, 62, 72, an allocation of flow between two or more legs 30a, 30a', 30a'', 30a''', 30a'''', 30b, 50a, 50b, 70a, 70b, 80a, 80a', 80a'', 80b, 80b', etc., may be determined experimentally based on the application. For example, the characteristic(s) may be determined when one or more components of the exhaust treatment system 20, 30, 50, 60, 70, 80, e.g., the components of the exhaust treatment system 20, 30, 50, 60, 70, 80 upstream from the SCR device 28, are operating at a predetermined operating condition and when the flow of exhaust directed to the SCR device 28 achieves the target $NO:NO_2$ ratio of 50:50. The predetermined operating condition may include, e.g., a predetermined mass flow, a predetermined temperature, or other operating condition when NOx conversion is difficult and/or when there is less than 50% $NO_2$. The predetermined mass flow may be, e.g., approximately 60,000 volume hour space velocity (VHSV) (60,000 $hr^{-1}$) or less, the predetermined temperature of the flow of exhaust may be, e.g., approximately 250 to 350° C. For example, in one embodiment, the percentage of holes coated in the oxidizing device and/or the allocation of flow between two or more legs, may be determined when the following operating conditions are achieved: the components of the exhaust treatment system upstream from the SCR device 28 have a VHSV of approximately 60,000 $hr^{-1}$, the temperature of the flow of exhaust directed to the SCR device 28 is between 250 to 350° C., and the flow of exhaust directed to the SCR device 28 achieves a $NO:NO_2$ ratio of 50:50. Then, the determined characteristic (e.g., percentage of holes coated and/or allocation of flow) may become the target characteristic for the exhaust treatment system 20, 30, 50, 60, 70, 80.

In view of the foregoing disclosure, one skilled in the art may readily conceive or identify additional configurations of the exhaust treatment system sufficient to realize the desired $NO_2$ control functions. For example, the embodiments of the exhaust treatment systems 80 shown in FIGS. 8 and 9A-9C illustrate additional configurations of the components, e.g., the upstream injector 21, the oxidation device 22, the upstream SCR device 23, and the particulate filter 24, of the exhaust treatment systems shown in FIGS. 1, 3, 4A-4D, and 5-7. The exhaust treatment systems 80 shown in FIGS. 8 and 9A-9C operate using the same principles of operation as described above in connection with FIGS. 1, 3, 4A-4D, and 5-7.

It will be apparent to those skilled in the art that various modifications and variations can be made to the exhaust treatment system. Other embodiments will be apparent to those skilled in the art from consideration of the specification and practice of the disclosed exhaust treatment system. It is intended that the specification and examples be considered as exemplary only, with a true scope being indicated by the following claims and their equivalents.

What is claimed is:

1. An exhaust treatment system comprising:
a catalyzed particulate filter disposed in a first passageway and configured to receive a first portion of a flow of exhaust, the catalyzed particulate filter being at least partially coated with a catalytic material for converting NO to $NO_2$;
a second passageway configured to direct a second portion of the flow of exhaust around the catalyzed particulate filter;
a selective catalytic reduction device disposed downstream from the first passageway and the second passageway, the selective catalytic reduction device being configured to receive a combined flow of exhaust including the first and second portions of the flow of exhaust.

2. The exhaust treatment system of claim 1, further including a particulate filter disposed in the second passageway.

3. The exhaust treatment system of claim 2, wherein at least one of the catalyzed particulate filter and the particulate filter is a flow through type filter.

4. The exhaust treatment system of claim 2, further including an oxidation device disposed upstream from the particulate filter in the second passageway, the oxidation device having a plurality of channels through which the second portion of the flow of exhaust flows, a percentage less than 100% of the channels of the oxidation device being coated with the catalytic material.

5. The exhaust treatment system of claim 1, wherein the first portion of the flow of exhaust includes approximately 50% of the combined flow of exhaust.

6. The exhaust treatment system of claim 1, further including a first valve disposed in at least one of the first passageway and the second passageway.

7. The exhaust treatment system of claim 6, wherein the first valve is configured to control an amount of flow through the valve based on a target $NO:NO_2$ ratio in the combined flow of exhaust supplied to the selective catalytic reduction device.

8. The exhaust treatment system of claim 7, wherein the first valve is controlled based on a characteristic determined when operating at a predetermined operating condition when the target $NO:NO_2$ ratio is achieved, the predetermined operating condition including at least one of a predetermined mass flow and a predetermined temperature.

9. The exhaust treatment system of claim 7, wherein the target NO:NO$_2$ ratio in the combined flow of exhaust supplied to the selective catalytic reduction device is approximately 50:50.

10. The exhaust treatment system of claim 6, wherein the first valve is disposed in the first passageway and a second valve is disposed in the second passageway.

11. The exhaust treatment system of claim 1, wherein the catalyzed particulate filter is substantially completely coated with the catalytic material.

12. The exhaust treatment system of claim 1, wherein the catalytic material is platinum.

13. A method for treating a flow of exhaust comprising:
generating the flow of exhaust;
passing a first portion of the flow of exhaust through a first passageway including a catalyzed particulate filter at least partially coated with a catalytic material for converting NO to NO$_2$;
passing a second portion of the flow of exhaust through a second passageway configured to direct the second portion of the flow of exhaust around the catalyzed particulate filter;
combining the first and second portions of the flow of exhaust downstream from the catalyzed particulate filter to form a combined flow of exhaust; and
directing the combined flow of exhaust to a selective catalytic reduction device.

14. The method of claim 13, further including adjusting an allocation of flow between the first and second portions of the flow of exhaust.

15. The method of claim 14, further including determining the allocation of flow based on a target NO:NO$_2$ ratio in the flow of exhaust supplied to the selective catalytic reduction device.

16. The method of claim 14, wherein the adjusting of the allocation of flow including controlling an amount of flow through at least one of the second passageway and the first passageway.

17. The method of claim 16, wherein the controlling of the amount of flow through the at least one of the first and second passageways includes controlling a first valve disposed in the first passageway and a second valve disposed in the second passageway to restrict the flow of the first and second portions of the flow of exhaust through the respective passageways simultaneously.

18. The method of claim 13, wherein the passing of the second portion of the flow of exhaust through the second passageway includes passing the second portion of the flow of exhaust through an oxidation device and a particulate filter, the oxidation device having a plurality of channels through which the second portion of the flow of exhaust flows, a percentage less than 100% of the channels of the oxidation device being coated with the catalytic material.

19. The method of claim 13, further including injecting reductant upstream from the catalyzed particulate filter.

20. The method of claim 19, further including:
sensing a characteristic of the first portion of the catalyzed particulate filter; and
controlling the injection of reductant based on the sensed characteristic.

21. An exhaust treatment system comprising:
a catalyzed particulate filter disposed in a first passageway and configured to receive a first portion of a flow of exhaust, the catalyzed particulate filter being at least partially coated with a catalytic material for converting NO to NO$_2$;
an upstream injector disposed upstream from the catalyzed particulate filter, the upstream injector configured to inject reductant into the first portion of the flow of exhaust;
a second passageway configured to direct a second portion of the flow of exhaust around the catalyzed particulate filter; and
a selective catalytic reduction device disposed downstream from the catalyzed particulate filter and the second passageway, the selective catalytic reduction device being configured to receive a combined flow of exhaust including the first and second portions of the flow of exhaust.

22. The exhaust treatment system of claim 21, further including:
a sensor configured to sense a characteristic of the catalyzed particulate filter; and
a controller connected to the sensor, the controller being configured to receive a sensed characteristic and control an injection of reductant by the upstream injector based on the sensed characteristic.

23. The exhaust treatment system of claim 22, wherein the sensed characteristic is a temperature of the catalyzed particulate filter.

24. The exhaust treatment system of claim 23, wherein the injection occurs when the sensed temperature of the catalyzed particulate filter is within a predetermined range.

25. The exhaust treatment system of claim 24, wherein the predetermined range is approximately 200° C. to 350° C.

26. The exhaust treatment system of claim 21, wherein:
the selective catalytic reduction device is a downstream selective catalytic reduction device; and
the exhaust treatment system further includes an upstream selective catalytic reduction device disposed upstream from the catalyzed particulate filter in the first passageway and downstream from the upstream injector.

27. The exhaust treatment system of claim 26, further including:
a sensor configured to sense a characteristic of the catalyzed particulate filter; and
a controller connected to the sensor, the controller being configured to receive a sensed characteristic and control an injection of reductant by the upstream injector based on the sensed characteristic.

28. The exhaust treatment system of claim 26, further including:
an oxidation device disposed upstream from a particulate filter in the second passageway, the oxidation device having a plurality of channels through which the second portion of the flow of exhaust flows, a percentage less than 100% of the channels of the oxidation device being coated with the catalytic material;
a second selective catalytic reduction device disposed in the second passageway upstream from the particulate filter; and
a second injector disposed upstream from the second selective catalytic reduction device, the second injector configured to inject reductant into the second portion of the flow of exhaust.

* * * * *